US008259773B2

United States Patent
Lee

(10) Patent No.: US 8,259,773 B2
(45) Date of Patent: Sep. 4, 2012

(54) METHOD AND APPARATUS FOR MULTIPLEXING CODE DIVISION MULTIPLE ACCESS AND SINGLE CARRIER FREQUENCY DIVISION MULTIPLE ACCESS TRANSMISSIONS

(75) Inventor: Jung A. Lee, Pittstown, NJ (US)

(73) Assignee: Alcatel Lucent, Paris (FR)

( * ) Notice: Subject to any disclaimer, the term of this patent is extended or adjusted under 35 U.S.C. 154(b) by 1323 days.

(21) Appl. No.: 11/554,916

(22) Filed: Oct. 31, 2006

(65) Prior Publication Data

US 2008/0101440 A1 May 1, 2008

(51) Int. Cl.
H04B 1/00 (2006.01)
(52) U.S. Cl. ........ 375/130; 375/141; 375/260; 370/479; 370/491; 370/344; 370/329; 370/336; 370/342
(58) Field of Classification Search ................. 370/479, 370/491, 344, 329, 336, 342; 455/571; 375/141, 375/130, 260
See application file for complete search history.

(56) References Cited

U.S. PATENT DOCUMENTS

| | | | |
|---|---|---|---|
| 2006/0050676 A1 | 3/2006 | Mansour | 370/342 |
| 2007/0004465 A1* | 1/2007 | Papasakellariou et al. | 455/571 |
| 2007/0041404 A1* | 2/2007 | Palanki et al. | 370/479 |
| 2007/0047451 A1* | 3/2007 | Lohr et al. | 370/242 |
| 2007/0064669 A1* | 3/2007 | Classon et al. | 370/347 |
| 2007/0165588 A1* | 7/2007 | McCoy | 370/344 |
| 2007/0177569 A1* | 8/2007 | Lundby | 370/349 |
| 2007/0183386 A1* | 8/2007 | Muharemovic et al. | 370/344 |
| 2007/0218843 A1* | 9/2007 | Mizusawa | 455/69 |
| 2008/0051125 A1* | 2/2008 | Muharemovic et al. | 455/519 |
| 2008/0090583 A1* | 4/2008 | Wang et al. | 455/452.1 |
| 2008/0095106 A1* | 4/2008 | Malladi et al. | 370/329 |
| 2008/0095110 A1* | 4/2008 | Montojo et al. | 370/330 |
| 2008/0101306 A1* | 5/2008 | Bertrand et al. | 370/336 |
| 2008/0101440 A1* | 5/2008 | Lee | 375/141 |
| 2008/0144547 A1* | 6/2008 | Kwon et al. | 370/310 |
| 2008/0267157 A1* | 10/2008 | Lee et al. | 370/342 |
| 2009/0052470 A1* | 2/2009 | Yun et al. | 370/491 |
| 2009/0296563 A1* | 12/2009 | Kishiyama et al. | 370/210 |
| 2009/0303937 A1* | 12/2009 | Sawahashi et al. | 370/329 |

OTHER PUBLICATIONS

PCT International Search Report PCT/US2008/002533 dated May 30, 2008.
Carni, E. et al., "Synchronous CDMA Based on the cyclical Translations of a Cazac Seuence" *Wireless Communication Systems, 2005 2nd International Symposium on Siena, Italy Sep. 5-9, 2005*, Piscataway NJ, USA, IEEE, (Sep. 5, 2005), pp. 442-446, XP010886290; ISBN: 978-0/7803-9206-9.
"Updated Lucent-Nortel-Samsung proposal for Air Interface Evolution Phase 2" *3rd Generation Partnership Project 2 3GPP2*, (2006-04-260, pp. 96-131, XP002463759.

(Continued)

*Primary Examiner* — Shuwang Liu
*Assistant Examiner* — Sung Ahn
(74) *Attorney, Agent, or Firm* — Williams, Morgan & Amerson

(57) ABSTRACT

The present invention provides a method and apparatus for multiplexing code division and frequency division transmissions. One embodiment of the method includes accessing at least one first symbol and at least one second symbol, encoding the at least one first symbol according to a frequency division protocol, and encoding the at least one second symbol using a coding sequence having a cyclic correlation property. The method also includes transmitting a radiofrequency signal indicative of the at least one encoded first symbol and the at least one encoded second symbol.

13 Claims, 6 Drawing Sheets

OTHER PUBLICATIONS

Hyung G. Myung et al., "Single Carrier FDMA for Uplink Wireless Transmissin" *IEE Vehicular Technnology Magazine, IEEE US*, vol. 1, No. 3, (Sep. 1, 2006), pp. 30-38, XP011165321, ISSN: 1556-6072.

Brian Classon et al,, "Overview of UMTS Air-Interface Evolution" Vehicular Technology Conference, 2006, VTC-2006 Fall. 2006 *IEEE 64th*, IEEE, PI., (Sep. 1, 2006), pp. 1-5, XP002479511.

* cited by examiner

METHOD AND APPARATUS FOR MULTIPLEXING CODE DIVISION MULTIPLE ACCESS AND SINGLE CARRIER FREQUENCY DIVISION MULTIPLE ACCESS TRANSMISSIONS

BACKGROUND OF THE INVENTION

1. Field of the Invention

This invention relates generally to communication systems, and, more particularly, to wireless communication systems.

2. Description of the Related Art

Wireless communication systems typically include one or more base stations or access points for providing wireless connectivity to mobile units in a geographic area associated with each base station or access point. Mobile units and base stations communicate by transmitting modulated radiofrequency signals over a wireless communication link, or air interface. The air interface includes downlink (or forward link) channels for transmitting information from the base station to the mobile unit and uplink (or reverse link) channels for transmitting information from the mobile unit to the base station. The uplink and downlink channels are typically divided into data channels, random access channels, broadcast channels, paging channels, control channels, and the like.

The channels in a wireless communication system are defined by one or more transmission protocols. For example, in wireless communication systems that operate according to the Frequency Division Multiple Access (FDMA) protocol, the transmission bandwidth allocated to the air interface is divided into a number of frequencies and these frequencies are allocated to the various channels. For another example, Code Division Multiple Access (CDMA) protocols implement coding sequences that may be used to modulate transmitted information so that multiple users may transmit on the same frequency or set of frequencies. Other transmission protocols include Orthogonal Frequency Division Multiple Access (OFDMA) and Single Channel-FDMA (SC-FDMA). In an OFDMA system, the available bandwidth may be divided into a plurality of orthogonal subcarrier frequencies (commonly referred to as subcarriers), which may be allocated to one or more subchannels so that multiple users may transmit data concurrently using separate groups of subchannels. In SC-FDMA, the available bandwidth is also divided into a plurality of orthogonal subcarriers similar to OFDMA, but discrete Fourier transform (DFT) pre-coding is used to provide low Peak-to-Average-Power Ratio (PAPR) compared with OFDMA transmission.

Wireless communication systems that operate according to OFDMA protocols also implement scheduling of data transmissions on the uplink. Scheduling refers to allocating time-frequency resource(s) of the wireless communication system for data transmission. Scheduling involves transmitting a scheduling request in the uplink and a scheduling grant in the downlink before data transmission. Scheduling increases latency and overhead in the wireless communication system. Scheduling data transmission is not typically desirable, or even always possible, for traffic that is delay sensitive and/or has small packet sizes, such as Voice over Internet Protocol (VoIP), Layer-1 control signaling, Layer-2 control signaling, and the like. Consequently, in Evolved UMTS Terrestrial Radio Access (E-UTRA) system, SC-FDMA with discrete Fourier transform (DFT) precoding was introduced in the uplink. Orthogonality of in-cell users is achieved by using OFDM in the presence of frequency-selective fading. Furthermore, DFT precoding was introduced to reduce the large Peak-to-Average-Power-Ratio (PAPR) of the pure OFDM transmission. With the addition of higher-order modulation and adaptive modulation coding (AMC), large spectral efficiency is possible by scheduling users with favorable channel conditions. However, to realize the large spectral efficiency of SC-FDMA system, fast scheduling in time and frequency is necessary. This may add a large amount of scheduling overhead for both the uplink and the downlink control channels, and may be inefficient when supporting a large number of delay-sensitive and/or low data rate traffic flows. One possible approach for supporting low data rate traffic flows is to semi-statically allocate time-frequency zones or to implement interference avoidance schemes. However, these approaches may suffer from low channel utilization.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for transmitting multiplexed symbols. One embodiment of the method includes accessing at least one first symbol and at least one second symbol, encoding the at least one first symbol according to a frequency division protocol, and encoding the at least one second symbol using a coding sequence having a cyclic correlation property. The method also includes transmitting a radiofrequency signal indicative of the at least one encoded first symbol and the at least one encoded second symbol.

In another embodiment of the present invention, a method is provided for receiving multiplexed symbols. One embodiment of the method includes accessing information indicative of at least one first symbol encoded according to a frequency division protocol and at least one second symbol encoded using at least one coding sequence having a cyclic correlation property. The information indicative of the first and second symbols is conveyed by a radiofrequency signal. The method also includes decoding the information indicative of the at least one first symbol according to the frequency division protocol and decoding the information indicative of the at least one second symbol using said at least one coding sequence having a cyclic correlation property.

BRIEF DESCRIPTION OF THE DRAWINGS

The invention may be understood by reference to the following description taken in conjunction with the accompanying drawings, in which like reference numerals identify like elements, and in which.

Figure 1:
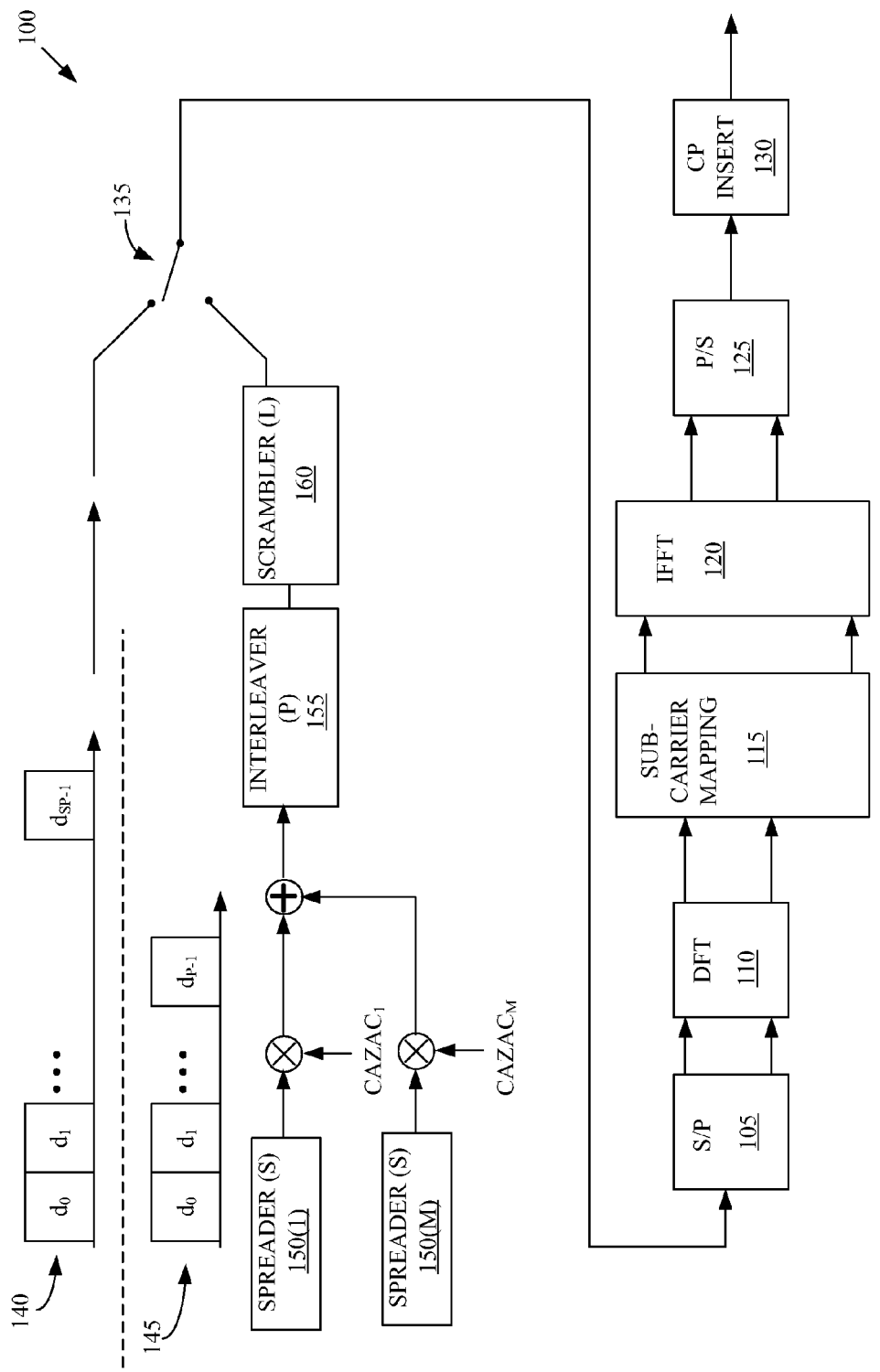
FIG. 1 conceptually illustrates one exemplary embodiment of a transmission device, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a transmission device 100. In the illustrated embodiment, the transmission device 100 may be implemented in a mobile unit, such as a cellular telephone, a personal data assistant, a smart phone, a network interface card, a text messaging device, a paging device, a laptop computer, a desktop computer, and the like. The transmission device 100 may be used to transmit data symbols by modulating radiofrequency signals. In the illustrated embodiment, the transmission device 100 operates according to a Code Division Multiple Access (CDMA) protocol and a single channel-Frequency Division Multiple Access (SC-FDMA) protocol. However, persons of ordinary skill in the art having benefit of the present disclosure should appreciate that the present invention is not limited to these particular protocols and in alternative embodiments the transmission device 100 may operate according to other protocols.

The transmission device 100 is configured to form one or more frames using encoded symbols. In the illustrated embodiment, the transmission device 100 includes a serial-to-parallel converter 105 that receives a serial stream of encoded data symbols and converts the stream into a plurality of parallel streams that are provided to a discrete Fourier transform (DFT) element 110. Signals from the DFT element 110 are provided to a sub-carrier mapping element 115, which maps the Fourier transformed streams onto the appropriate subcarriers.

Figure 2A:
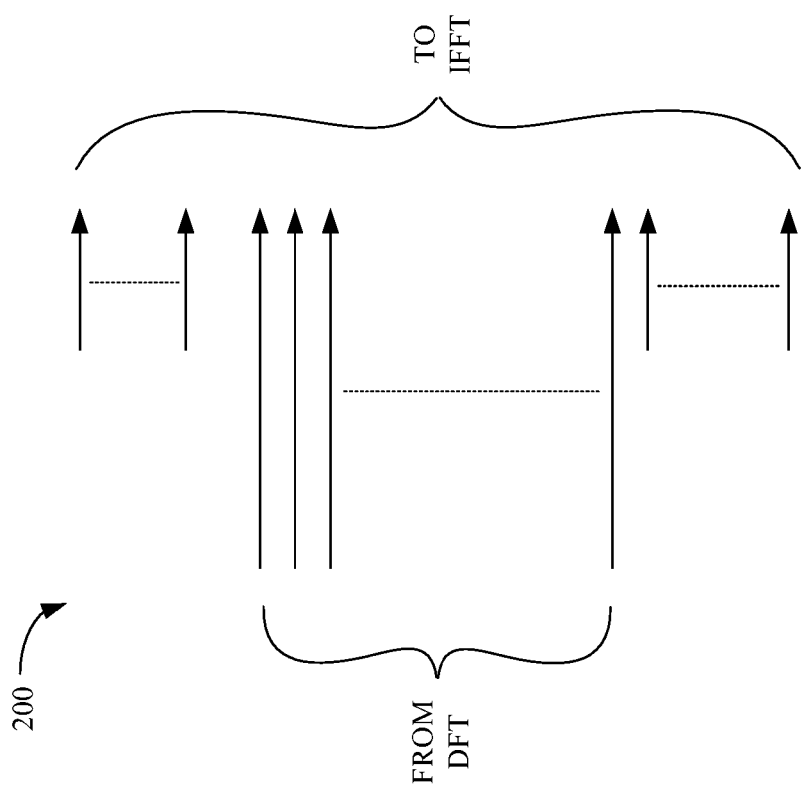
FIGS. 2A and 2B conceptually illustrate two exemplary mappings of subcarriers, in accordance with the present invention.
Figure 2B:
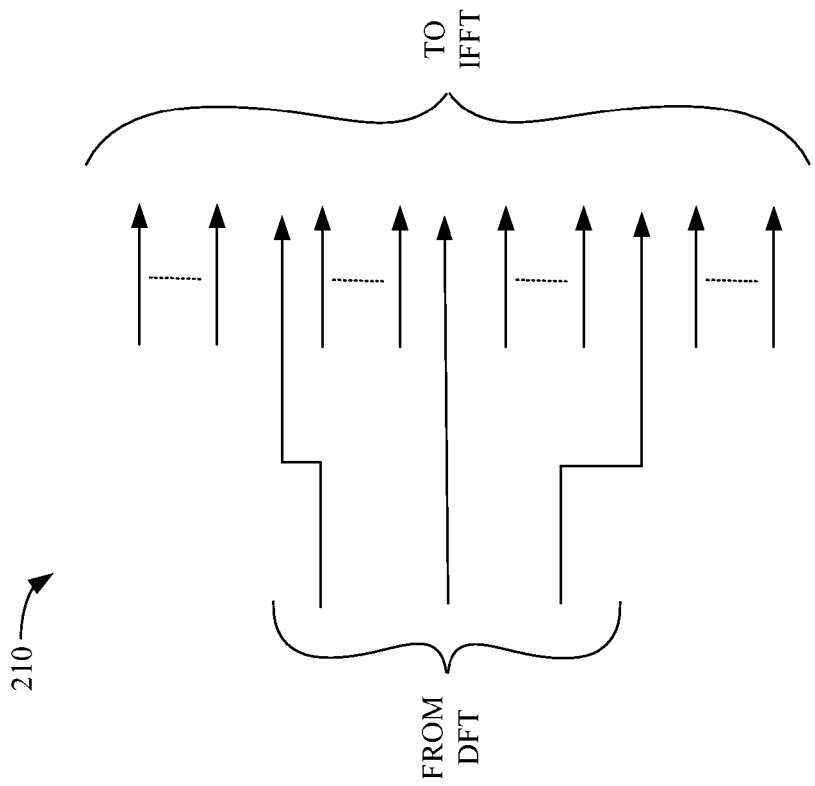

FIGS. 2A and 2B conceptually illustrate two exemplary mappings of subcarriers 200, 210. In the first exemplary embodiment, shown in FIG. 2A, the data streams from the DFT element 110 are mapped onto adjacent subcarriers. In the second exemplary embodiment, shown in FIG. 2B, the data streams from the DFT element 110 are distributed among the available subchannels. Zeros may be transmitted on the unused subchannels.

Referring back to FIG. 1, the sub-carrier mapping element 115 provides the mapped streams to an inverse fast Fourier transform (IFFT) element 120. Parallel streams from the inverse fast Fourier transform element 120 are provided to a parallel-to-serial converter 125, which forms a serial stream that is provided to a cyclic prefix (CP) insertion element 130. Techniques for configuring and operating the elements 105, 110, 115, 120, 125, 130 are known in the art and in the interest of clarity only those aspects of configuring and/or operating the elements 105, 110, 115, 120, 125, 130 that are relevant to the present invention will be discussed further herein.

The transmission device 100 may operate in at least two modes, depending upon the state of switch 135. In the first mode, the switch 135 permits a first stream 140 of data symbols to be provided to the elements 105, 110, 115, 120, 125, 130 for eventual transmission over the air interface. In one embodiment, the data symbols in the first stream 140 are intended to be transmitted over the air interface using dedicated time and/or frequency resources. For example, the stream 140 may be transmitted over an uplink from a mobile unit to a base station according to the SC-FDMA protocol. In the second mode, the switch 135 permits a second stream 145 of data symbols to be provided to the elements 105, 110, 115, 120, 125, 130 for eventual transmission over the air interface. In one embodiment, the data symbols in the second stream 145 are intended to be transmitted over the air interface using time and/or frequency resources that may be shared with other transmission devices (not shown in FIG. 1). For example, the stream 145 may be transmitted over an uplink from a mobile unit to a base station according to the CDMA protocol.

The second stream 145 is encoded using code sequences that have a cyclic correlation property. In the illustrated embodiment, a multi-code data stream is generated from the second stream 145 using M code sequences that have a cyclic correlation property. The data symbols in the second stream 145 are spread bit-by-bit by spreading factor S using the spreaders 150(1-M) and then multiplied by the M coding sequences. In the illustrated embodiment, the coding sequences are constant amplitude zero autocorrelation ($CAZAC_{1-M}$) coding sequences. The spread signal, which has length S×P, is interleaved by a block interleaver 155 of length P. The signal is multiplied by scrambling sequence or code using a scrambler 160. The scrambling sequence or code may be specific to each user and can be either a Pseudo-Noise (PN) sequence or a CAZAC sequence. The length of the scrambling sequence in the illustrated embodiment is S×P×L, where L is the number of Long Blocks in a transmission time interval (TTI).

Figure 3:
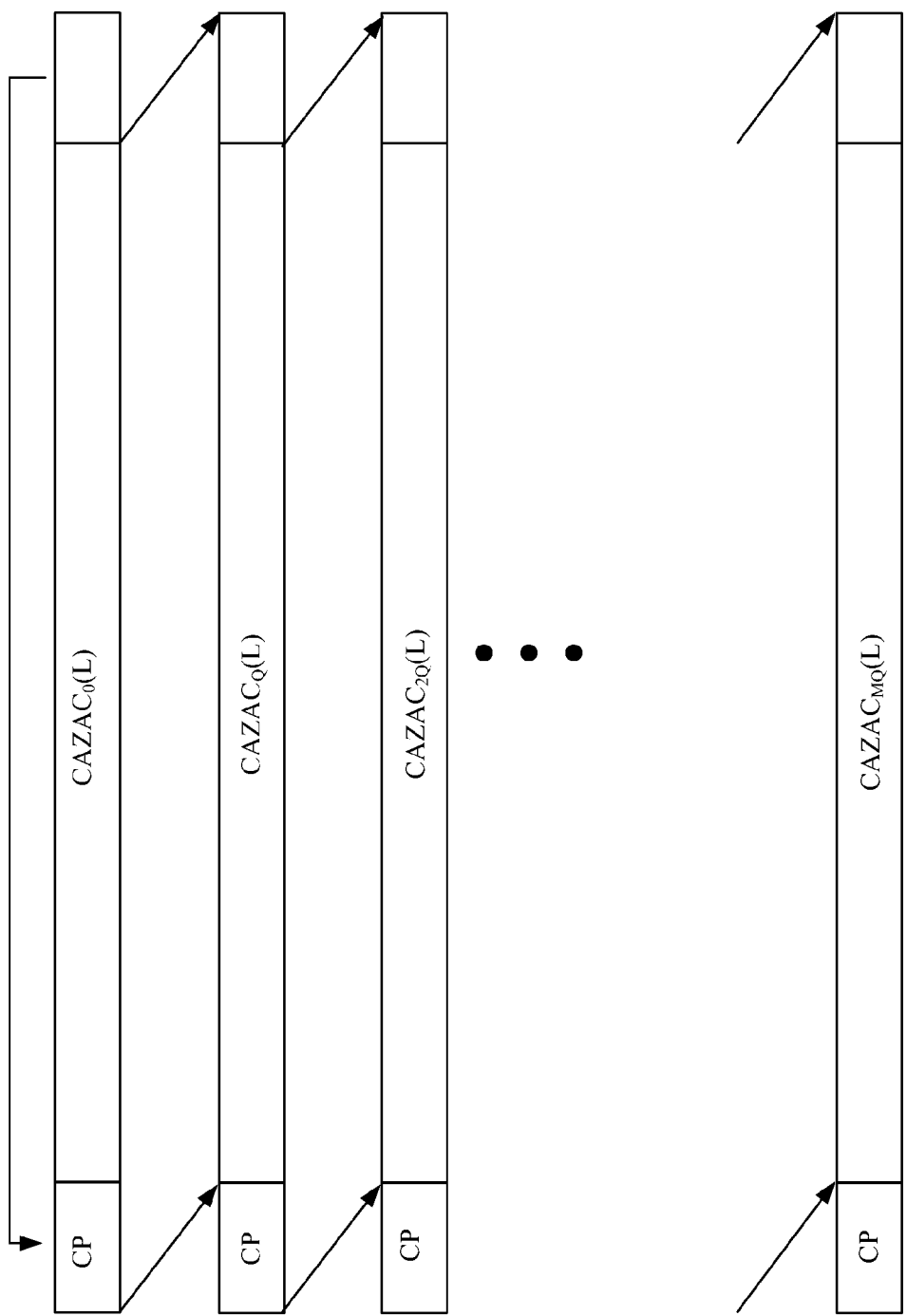
FIG. 3 conceptually illustrates generation of a code sequence having a cyclic correlation property, in accordance with the present invention.

FIG. 3 conceptually illustrates generation of a code sequence having a cyclic correlation property. In the illustrated embodiment, a set of orthogonal CAZAC sequences are generated using a cyclic shift of an initial sequence, $CAZAC_0(L)$. For example, a portion of the initial sequence $CAZAC_0(L)$ is copied from the right-hand side of the sequence shown in FIG. 2 to the left-hand side to form the cyclic prefix (CP) for the initial sequence $CAZAC_0(L)$. The next sequence $CAZAC_Q(L)$ is formed by dropping the right-hand side portion of the initial sequence $CAZAC_0(L)$ and appending the cyclic prefix to the sequence $CAZAC_Q(L)$. The cyclic prefix of the new sequence $CAZAC_Q(L)$ is again formed by copying a portion of the right-hand side of the sequence $CAZAC_Q(L)$ and appending it to the left-hand side of the sequence $CAZAC_Q(L)$. Additional sequences $CAZAC_{2Q-MQ}(L)$ may be formed using the same algorithm.

As long as the cyclic shift is longer than the maximum delay spread, the cyclically-shifted sequences are orthogonal. For GSM TU profile, the maximum delay spread is 5 μsec. In 5 MHz bandwidth, this corresponds to 39 samples. So a value Q=39 may be selected. The number of shift-orthogonal CAZAC sequences of length 300 is 8. Up to 8 users can use orthogonal CAZAC sequences. Different CAZAC sequences can be used to support larger number of users. In one embodiment, users with similar radio propagation conditions are grouped together and assigned orthogonal CAZAC sequences, which are generated from cyclic shift operation. Different groups of users are assigned different basic CAZAC sequences. Up to 8 users can be allocated in each group. This scheme facilitates receiver design with SIC, by allowing group-wise interference cancellation.

Referring back to FIG. 1, the transmission device 100 may select either the first or second mode for transmission based upon the transmission time interval that will be used to transmit the frames that are being formed. For example, if the transmission device 100 implements Hybrid Automatic Repeat Request (HARQ), then the HARQ process identifier associated with each transmission time interval may be used to select the first or second modes for transmission. Since the data symbols in the second stream 145 are encoded using orthogonal code sequences having a cyclic correlation property, they may be transmitted concurrently with data symbols transmitted by other devices during a given transmission time interval. Some transmission time intervals may therefore be reserved for shared data transmission by multiple users. The transmission devices 100 may then use knowledge of these transmission time intervals, e.g., the HARQ IDs of shared transmission time intervals, to determine when to select the first or the second modes for transmission.

Figure 4:
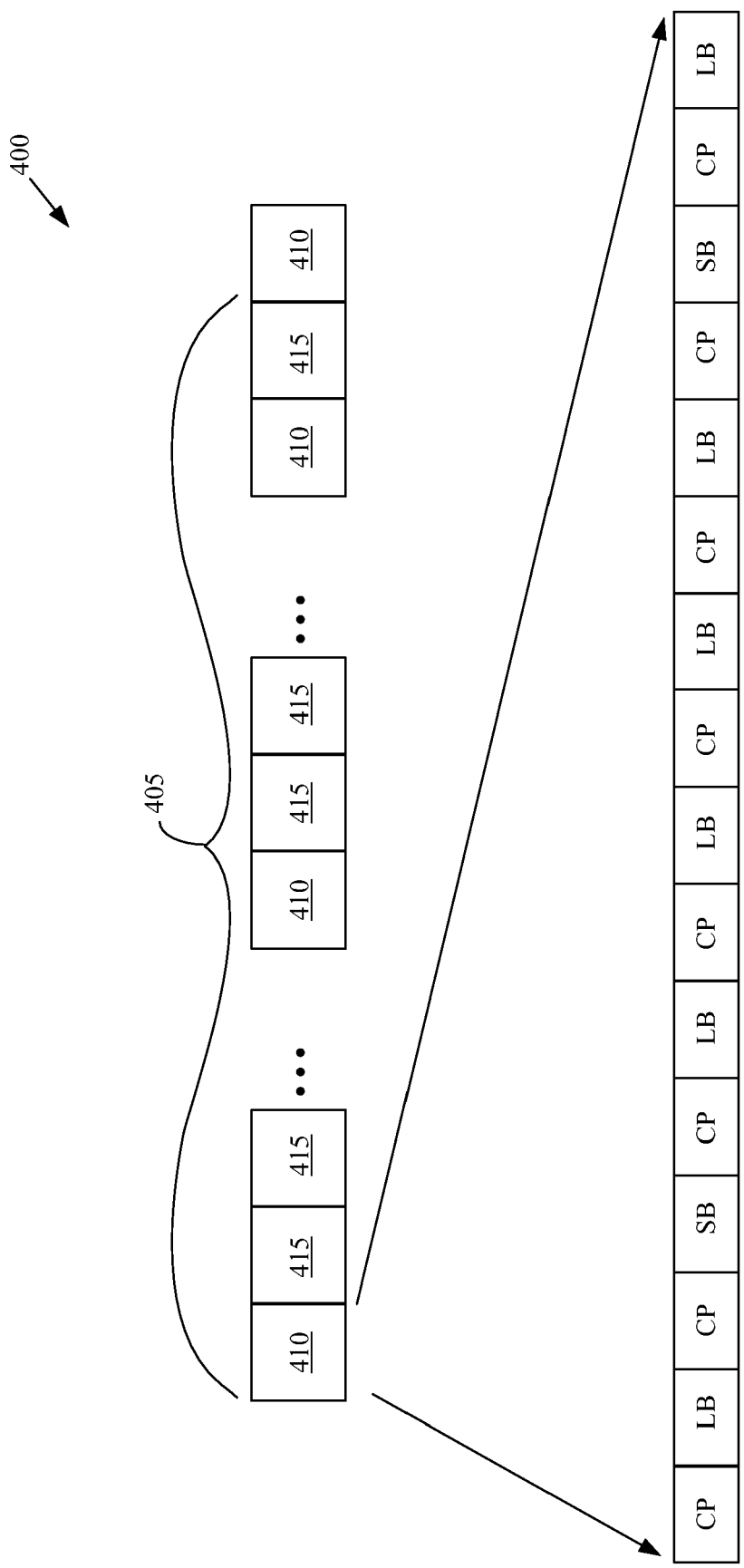
FIG. 4 conceptually illustrates one exemplary embodiment of a frame structure, in accordance with the present invention.

FIG. 4 conceptually illustrates one exemplary embodiment of a frame structure 400. In the illustrated embodiment, the frame structure 400 includes a VoIP frame 405. However, persons of ordinary skill in the art having benefit of the present disclosure should appreciate that the present invention is not limited to forming VoIP frames 405. In alternative embodiments other types of frames, such as high speed data transmission frames and Layer-1 and Layer-2 control signaling frames, may also be formed. The frame 405 includes one or more shared transmission time intervals 410, which may be indicated by a HARQ ID, and one or more dedicated transmission time intervals 415, which may also be indicated by HARQ IDs. Transmission devices, such as the transmission device 100 shown in FIG. 1, may encode data for transmission in the shared transmission time intervals 410 using code sequences that have cyclic correlation properties so that multiple users may share this transmission time interval and/or frequency. Transmission devices may encode data for transmission in the dedicated transmission time intervals 415 using a frequency division protocols such as SC-FDMA.

The data transmitted in the shared transmission time intervals 410 may be grouped into cyclic prefixes (CP), long blocks (LB), and short blocks (SB). In the illustrated embodiment, a 7.95 kbps AMR codec with header compression is considered. The information bit rate before coding is 10.8 kbps. This corresponds to packet size of 216 bits, generated for every 20 msec voice frame. The number of sub-carriers available in a long block (LB) is 300. This means that 25 symbols with SF=12 may be transmitted in a LB. With 6 LBs in a sub-frame, 150 symbols can be transmitted in a LB. Assuming 18 bit MAC header, 16 bit CRC, and code rate of R=⅓, the number of encoded bits is (216+18+16)×3=750 bits. For QPSK modulation, the number of available symbols is 332 symbols per 20 msec. Therefore, 3 sub-frames are required for one transmission of the encoded voice frame, taking 1.5 ms per transmission. In the illustrated embodiment, the TTI length is 1.5 ms.

The long blocks are typically used to transmit the data symbols and the short blocks may include pilot signals for channel estimation and/or coherent demodulation. In one embodiment, the number of HARQ processes is assumed to be 6 and the maximum number of transmissions is assumed to be 4. In that case, for each sub-frame, there are 6 long blocks (LB) and 2 short blocks (SB). The two SBs contain the pilot signal for coherent demodulation. Three sub-frames comprise a TTI for voice transmission. For a voice frame arriving every 20 ms, a maximum of 4 transmissions is possible using two HARQ processes. The remaining HARQ processes may be used for high-speed data (HSD) transmission. For VoIP, maximum air interface delay is obtained as:

1:5 ms [queueing delay]+(9*3+1:5)ms [transmission/ retransmission]+ACK/NACK delay=30 ms+ACK/NACK delay If the number of HARQ processes is reduced to one, two transmissions are allowed for each voice frame. Latency may be improved greatly, at the expense of reduced early termination gain.

Figure 5:
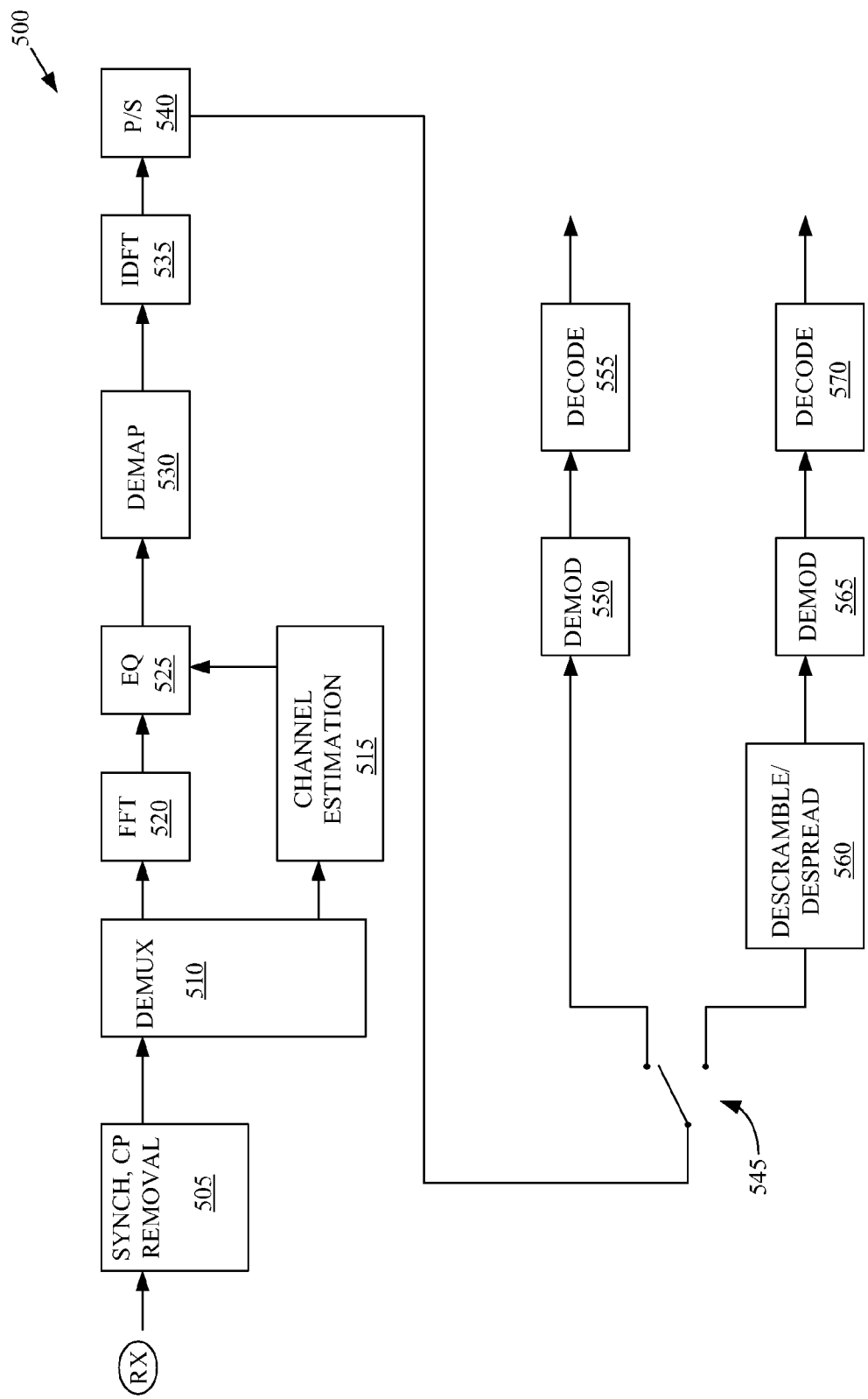
FIG. 5 conceptually illustrates one exemplary embodiment of a reception device, in accordance with the present invention.

FIG. 5 conceptually illustrates one exemplary embodiment of a receiver 500. In the illustrated embodiment, the receiver 500 is configured to operate in at least two modes. For example, a receiver 500 may operate in an SC-FDMA mode and a CDMA mode. Although the receiver 500 will be discussed herein under the assumption that the receiver 500 can operate in the SC-FMDA mode and the FDMA mode, persons of ordinary skill in the art having benefit of the present disclosure should appreciate that the present invention is not limited to these two particular modes.

The front-end of the receiver 500 is shared between the SC-FDMA mode and the CDMA mode. The receiver 500 receives and/or accesses a received signal (RX) or information indicative thereof, which is then provided to a symbol synchronization element 505. In the illustrated embodiment, the OFDM system implements coarse timing synchronization and the received signal is aligned at the OFDM symbol boundary. The symbol synchronization element 505 may also be configured to remove cyclic prefixes (CP). The synchronized data stream is then provided to a demultiplexer 510 that demultiplexes the pilot signal and the traffic signal from the data stream. After demultiplexing of the pilot and the traffic signals, the pilot signal is provided to a channel estimation element 515 and the traffic signal is transformed to frequency domain by a fast Fourier transform element 520. The channel estimation element 515 and the fast Fourier transform element 520 provide signals indicative of the channel estimate and the frequency transformed traffic, respectively, to an equalizer 525 for equalization. The equalized signal is then provided to a demapping element 530 and, after sub-carrier demapping, the signal is converted back to time domain by an inverse discrete Fourier transform element 535 and the parallel signals are converted back to a serial data stream by a parallel-to-serial converter 540.

The parallel-to-serial converter 540 provides the serial data stream to a switch 545. When the receiver 500 is operating in the SC-FDMA mode, the switch 545 functions to provide the serial data stream to a demodulator 550 and a decoder 555 for demodulation and decoding of the serial data stream to recover the symbols and/or bits from the received signal using the SC-FDMA protocol. When the receiver 500 is operating in the CDMA mode, in which case the received signal may include concurrent transmissions from multiple transmission devices that have been encoded using different code sequences, the switch 545 functions to provide the serial data stream to a descrambler/despreader 560, which then provides the descrambled and/or the despread data stream to a demodulator 565 and a decoder 570 for demodulation and decoding of the data streams according to the CDMA protocol. Transmission time intervals may be reserved for either dedicated transmission by a single user and/or shared data transmission by multiple users. The receiver 100 may use knowledge of these transmission time intervals, e.g., the HARQ IDs of shared transmission time intervals, to determine when to select the first or the second modes for reception.

Figure 6:
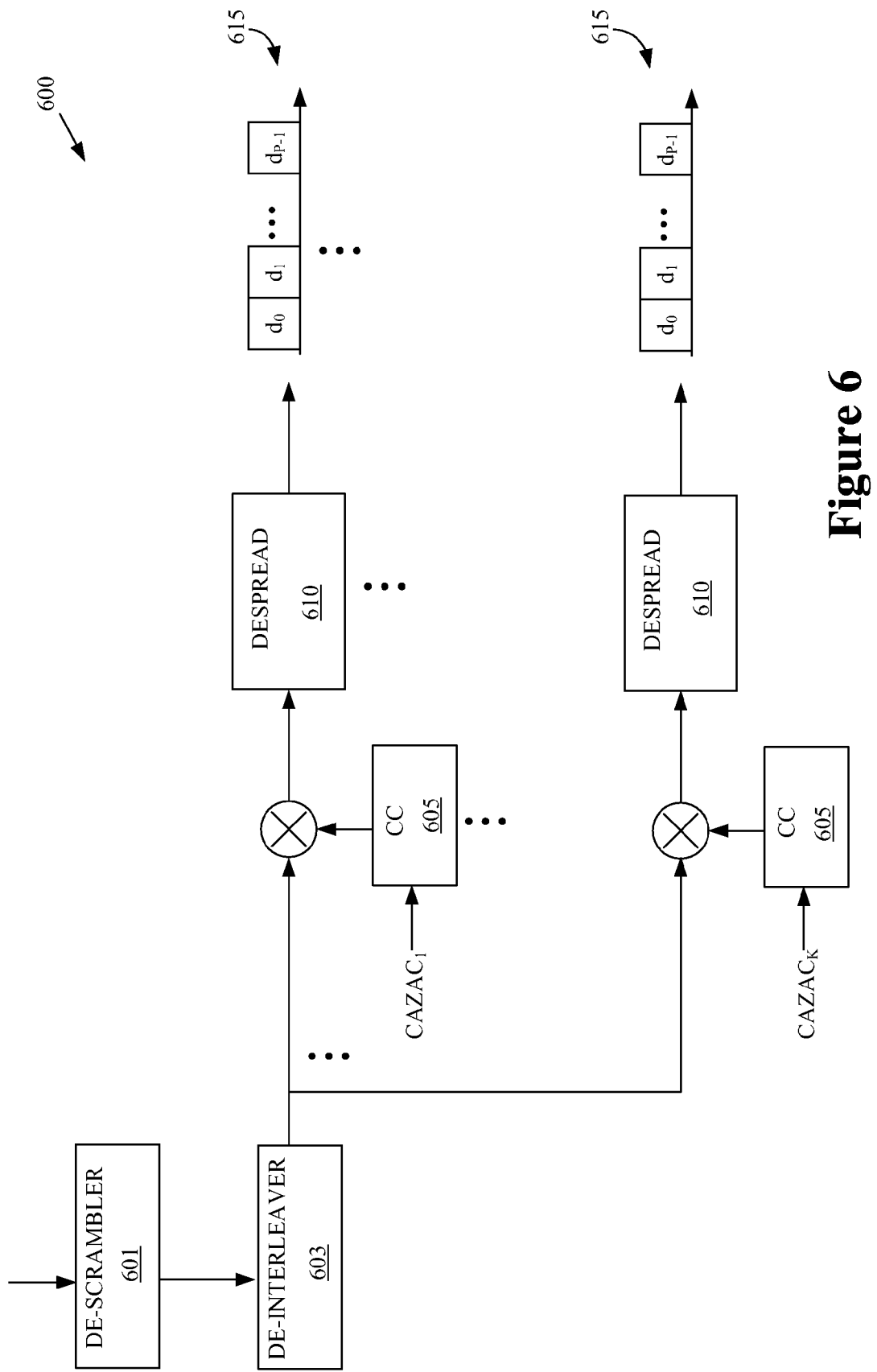
FIG. 6 conceptually illustrates one exemplary embodiment of a descrambler/despreader, in accordance with the present invention.

FIG. 6 conceptually illustrates one exemplary embodiment of a descrambler/despreader 600. In the illustrated embodiment, the descrambler/despreader 600 includes descrambler 601 and a de-interleaver 603. Data streams from each user may be descrambled by applying a user specific scrambling code at the descrambler 601. The descrambled signal is de-interleaved at the de-interleaver 603. For multi-code, dispreading is done for each multi-code. In the illustrated embodiment, the descrambler/despreader 600 includes K pathways for decoding received signals that may have been encoded with one of K different coding sequences that have a cyclic correlation property. For example, each of the K pathways may be used to attempt to decode signals that have been encoded using CAZAC sequences that have a length of SP. The complex conjugate of the coding sequence may be formed at a complex conjugation element 605 and the complex conjugate may be combined or correlated with the received signal to extract a portion of the received signal that was encoded using this coding sequence. The extracted portion of the received signal may then be provided to a block despreading unit 610, which may generate information indicative of the data symbols 615 received from the transmission device that transmits information encoded using the corresponding code sequence.

In various embodiments, different frequency reuse schemes may be used. For example, frequency reuse may include semi-static frequency allocation on the order of days and dynamic frequency allocation on the order of seconds. Dynamic frequency allocation can be made to adapt to cell loading or user loading variations. In this case, the reuse pattern can change between (1,1) reuse and (1,3). In (1,3) reuse, only ⅓ of the sub-carriers is available to a user. With the flexibility of SC-FDMA structure, soft frequency reuse for cell-edge users is envisioned to mitigate the impact of co-channel interference. The proposed CDMA transmission can softly adapt to bandwidth changes by changing the SF. If the full bandwidth is available, VoIP transmission with SF=12 can be supported. When ⅓ of the spectrum is available, spreading factor can be reduced to SF=4 to preserve the rates of each user. In this case, fewer users can be multiplexed in a given CDMA time-frequency resource. For some applications, capacity in terms of number of users may be more important than preserving per-user data rates. In such a scenario, per-user data rate may be reduced while preserving the user capacity, by reducing the modulation order, or by limiting the number of HARQ processes per user.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method implemented in a transmission device, comprising:
    encoding, in the transmission device, at least one first symbol;
    encoding, in the transmission device, at least one second symbol using a coding sequence having a cyclic correlation property so that the coding sequence is generated using a cyclic shift of an initial sequence;
    providing, during a transmission time interval (TTI), said at least one first encoded symbol through a switch that is set in a first mode when a hybrid automatic repeat request (HARQ) process identifier associated with the TTI indicates that dedicated time or frequency resources are used during the TTI and providing said at least one second encoded symbol through the switch that is set in a second mode when the HARQ process identifier associated with the TTI indicates that shared time or frequency resources are used during the TTI;
    transmitting, during the TTI, a radiofrequency signal indicative of said at least one encoded first symbol using dedicated time or frequency resources when the switch is in the first mode; and
    transmitting, during the TTI, the radiofrequency signal indicative of said at least one encoded second symbol using shared time or frequency resources when the switch is in the second mode.

2. The method of claim 1, wherein encoding said at least one first symbol comprises encoding a first data stream including a plurality of first data symbols and wherein encoding said at least one second symbol comprises encoding a second data stream including a plurality of second data symbols.

3. The method of claim 1, wherein encoding said at least one first symbol comprises encoding said at least one first symbol according to a single channel frequency division multiple access protocol.

4. The method of claim 1, wherein encoding said at least one second symbol comprises encoding said at least one second symbol using a constant amplitude zero autocorrelation coding sequence so that said at least one second encoded symbol can be transmitted concurrently with other encoded symbols using the shared time or frequency resources.

5. The method of claim 4, wherein encoding said at least one second symbol comprises forming a block comprising said at least one second symbol and at least one copy of said at least one second symbol.

6. The method of claim 5, wherein encoding said at least one second symbol comprises encoding the block using the constant amplitude zero autocorrelation coding sequence.

7. A method implemented in a receiver, comprising:
    accessing, at the receiver, information indicative of at least one encoded symbol, the information indicative of said at least one encoded symbol having been conveyed to the receiver by a radiofrequency signal during a transmission time interval (TTI);
    providing said at least one encoded symbol through a switch in the receiver to a first demodulation/decoding branch in the receiver when the switch is set in a first mode in response to a hybrid automatic repeat request (HARQ) process identifier associated with the TTI indicating that dedicated time or frequency resources are used during the TTI and providing said at least one encoded symbol through the switch to a second demodulation/decoding branch in the receiver when the switch is set in a second mode in response to the HARQ process identifier associated with the TTI indicating that dedicated time or frequency resources are used during the TTI;
    decoding the information indicative of said at least one encoded symbol using the first demodulation/decoding branch when the switch is in the first mode;
    descrambling and decoding the information indicative of said at least one encoded symbol using at least one coding sequence having a cyclic correlation property in the second demodulation/decoding branch when the switch is in the second mode, said at least one coding sequence being generated using a cyclic shift of an initial sequence.

8. The method of claim 7, wherein accessing the information indicative of said at least one encoded symbol comprises accessing information indicative of a plurality of symbols encoded using a plurality of orthogonal coding sequences, each coding sequence having the cyclic correlation property.

9. The method of claim 7, wherein accessing the information indicative of said at least one encoded symbol comprises accessing information indicative of said at least one symbol encoded according to a single channel frequency division multiple access protocol.

10. The method of claim 7, wherein accessing the information indicative of said at least one encoded symbol comprises accessing information indicative of said at least one symbol encoded using at least one constant amplitude zero autocorrelation coding sequence so that said at least one symbol can be transmitted concurrently with other symbols using shared time or frequency resources.

11. The method of claim 7, wherein decoding said at least one encoded symbol comprises decoding, according to a frequency division protocol, information conveyed by at least one first portion of the radiofrequency signal received during at least one first transmission time interval using dedicated time or frequency resources.

12. The method of claim 11, wherein decoding said at least one encoded symbol comprises decoding, using said at least one coding sequence having the cyclic correlation property, information conveyed by at least one second portion of the radiofrequency signal received during at least one second transmission time interval using shared time or frequency resources.

13. The method of claim 12, wherein decoding said at least one encoded symbol comprises applying a complex conjugate of said at least one coding sequence to the information conveyed by said at least one second portion of the radiofrequency signal.

* * * * *